United States Patent Office 2,862,337
Patented Dec. 2, 1958

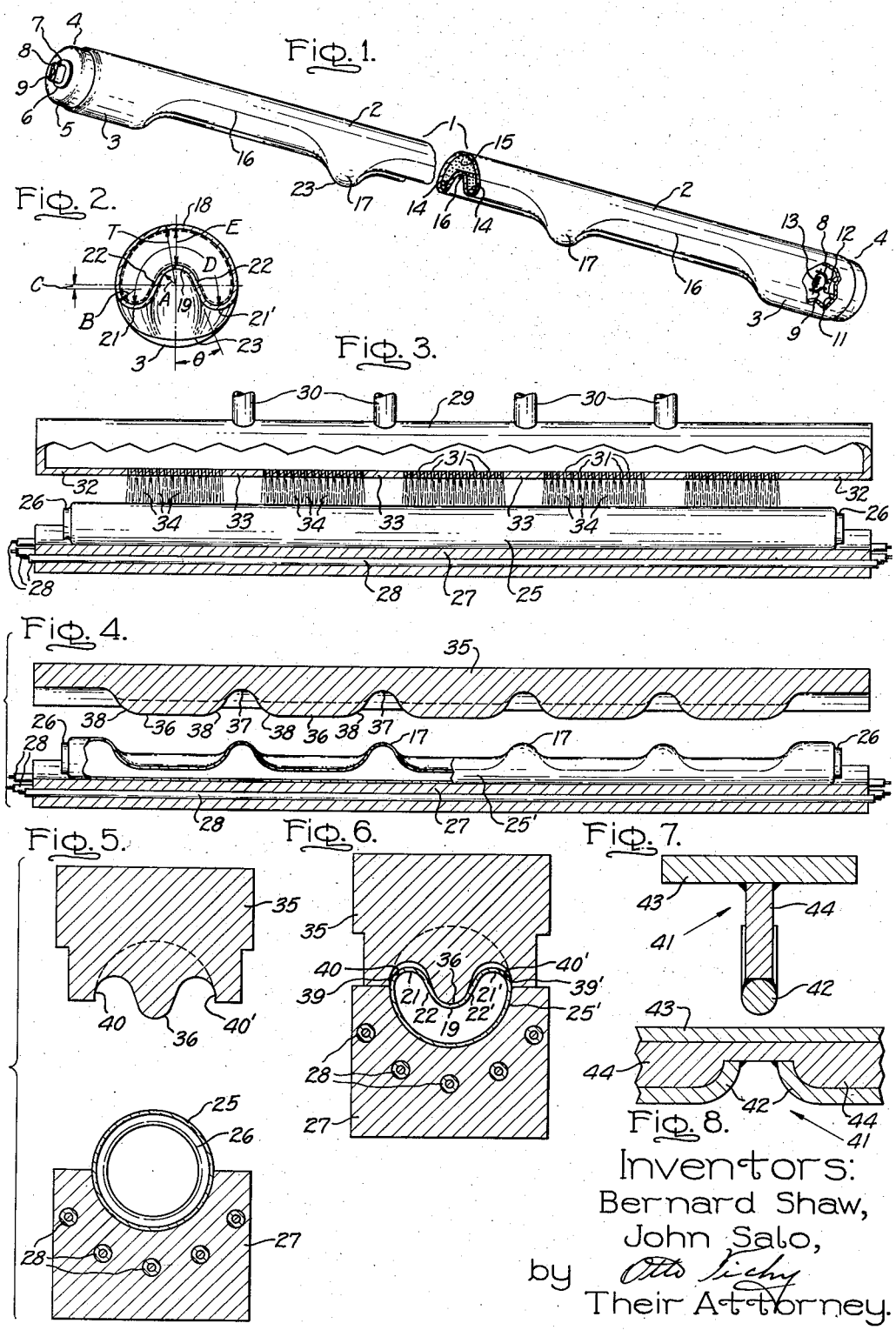

2,862,337

METHOD OF RESHAPING CYLINDRICAL GLASS TUBES

Bernard Shaw, Mayfield Heights, and John Salo, Euclid, Ohio, assignors to General Electric Company, a corporation of New York Application April 8, 1957, Serial No. 651,301

4 Claims. (Cl. 49—84)

The present invention relates to methods of reshaping hollow glass bodies and more particularly the invention relates to methods of reshaping elongated cylindrical glass tubes used as envelopes for evacuated electric discharge devices, such as fluorescent discharge lamps.

The copending joint application Serial No. 578,772, filed April 17, 1956 of Eugene Lemmers and the present applicants, which application is assigned to the assignee of the present application, discloses and claims an elongated vitreous envelope for an evacuated electric device of generally tubular form, for example a fluorescent discharge lamp, having longitudinally extending, transversely re-entrant groove sections spaced apart from each other along one side of the envelope and forming panels defining a discharge space within the envelope of the general cross section of a sector of an annulus. Between the groove sections the envelope has upstanding portions or ribs of generally circular section for strengthening the envelope against implosions. A fluorescent discharge lamp provided with such an envelope is also disclosed and claimed and a method of making the envelope together with a press bar or die plunger useful for shaping the envelope is disclosed in the above copending application.

As disclosed in the copending application, the method of making the grooved envelope, which method, together with the die plunger useful in carrying out the method, is the invention of the present applicants, comprises the steps of heating an open-ended, cylindrical vitreous body or glass tube, which has previously been provided with finished annularly reduced or shouldered end walls to adapt it for use as a fluorescent lamp envelope, to a temperature slightly below the softening temperature of the glass, heating selected separated areas along one side of the tube to a temperature at which the glass in said areas is softened and becomes plastic while heating the remainder of the tube to a temperature slightly below the softening temperature of the glass including the areas of the tube between the areas heated to a temperature at which the glass is softened, reshaping the tube at the softened plastic separated areas by folding the tube wall in said areas inwardly to form re-entrant grooves in said areas and to leave upstanding ribs between the reshaped areas. An important advantage of the method is the elimination of the need for creating within the tube at any time a pressure different from atmospheric pressure.

The drawing accompanying and forming part of this specification shows a fluorescent discharge lamp having an elongated glass envelope reshaped in accordance with the method of the present invention and also illustrates the method of reshaping an elongated open-ended cylindrical glass tube to form the lamp envelope.

In the drawing:

Fig. 1 is a pictorial view of a discharge lamp with sections of a discontinuous groove extending longitudinally along the underside of the lamp envelope, portions of the envelope wall being broken out to shorten the figure and to reveal the internal construction.

Fig. 2 is a cross-sectional view of the lamp of Fig. 1.

Fig. 3 is a side view of an open-ended vitreous cylindrical envelope positioned in a press bed or mold and being heated prior to reshaping.

Fig. 4 is a side view partly in section of the envelope reshaped to discontinuous groove wavy configuration and showing the forming or reshaping press bar or die plunger raised above it.

Figs. 5 and 6 are cross-sectional views of the lamp envelope in the mold, the former showing the envelope and plunger just prior to reshaping of the envelope and the latter at the completion of the reshaping step.

Fig. 7 is a cross-sectional view of a press bar or plunger of different structure from that of the plunger illustrated in Figs. 4, 5 and 6 and which is also useful in reshaping elongated cylindrical glass tubes into the form of the lamp envelope shown in Figs. 1 and 2.

Fig. 8 is a fragmentary, longitudinal sectional view on a reduced scale of the plunger shown in Fig. 7.

Referring to Fig. 1, there is shown a fluorescent lamp of the low-pressure, positive column type comprising an elongated vitreous envelope 2 reshaped by the method of the present invention. The envelope has circular or round tube ends 3, 3 which are annularly reduced or shouldered at their extremities. The structure of the lamp other than that of the envelope 2 is conventional. The lamp structure is included herein as showing the utility of the method of the present invention in connection with fluorescent discharge lamps.

The lamp includes bases 4, 4 secured to the reduced ends of the envelope 2. Each base may be of the double recessed contact type described in Patent 2,733,420, Marz, and comprises an annular metal shell 5 to which is secured a disc 6 of an insulating plastic provided with a raised elongated embossment 7. The outward projections of the lead wires 8, 9 extend through a central passage in the disc into the recessed outer face of the embossment to serve as contact terminals.

As shown at the end of the lamp having the cutaway portion, an electrode mount or stem flare 11 is sealed peripherally into each circular tube end and includes a press 12 through which are sealed the current inlead wires 8, 9. The inward projections of the lead wires support the filamentary cathode 13 which may consist of a coiled-coil of tungsten wire provided with an overwind and coated with an activated mixture of alkaline-earth oxides, such as the usual mixture comprising barium and strontium oxides. One of the stem flares is provided with an exhaust tube which is sealed or tipped off in the usual fashion.

The lamp contains an ionizable atmosphere including a starting gas or mixture of one or more of the inert rare gases of group O of the periodic table at a low pressure, for instance argon at a pressure of 0.5 to 5 mm. of mercury, and mercury vapor. The droplets of mercury indicated at 14 exceed in amount the quantity vaporized during the operation of the lamp wherein the mercury vapor exerts a partial pressure in the range of 1 to 20 microns for optimum generation of mercury resonance radiation at 2537 A. A phosphor coating indicated at 15 on the inside of the envelope converts the 2537 A. radiation into visible light.

The vitreous envelope 2 is provided with transversely re-entrant longitudinal groove sections or cavities 16. The series of groove sections extends substantially the entire length of the envelope between the rounded tube ends 3, 3. In between the groove sections there are provided raised portions or ribs 17 which separate the grooved sections or panels.

As illustrated in Fig. 2, the cross section of the envelope in the grooved panels between the ribs may be visualized as a flattened tube which has been rolled up transversely into an inverted U-shape. More exactly, the cross section of the discharge space in the grooved panels may be described as a sector of an annulus defined by generally concentric walls 18 and 19, and bounded by rounded convex edge walls 21, 21'. Convex outer wall 18 has the minimum curvature, its radius being that of the original open-ended, cylindrical glass tube from which the instant grooved tube was formed by reshaping before incorporation in the lamp of Fig. 1 in accordance with the present invention. Concave inner wall 19 has a greater curvature than outer wall 18, its radius of curvature being approximately one-third that of outer wall 18. Convex edge walls 21, 21' are provided with a slightly greater mean curvature than concave inner wall 19. This is done because whereas it is desirable to have the wall-to-wall spacing substantially constant, it is essential to avoid a constriction at the center. If such a constriction were permitted, the discharge would not fill the cross section uniformly and would tend to occupy the space to one side or the other of the constriction. Since molding of glass cannot in any event be performed with perfect accuracy, a practical solution resides in making the radius of curvature of the convex edge walls somewhat less than that of concave inner wall 19 or somewhat less than one-half the maximum wall-to-wall spacing of the concentric outer and inner walls 18, 19. Preferably the groove is provided with more or less straight slanting wall sections 22, 22' interposed between the curvatures of the top of the groove and of the edge walls. The side walls of the groove are thus outwardly divergent, that is, slanted downwardly and outwardly.

At the rib portions 17 which divide the lamp into panels, the cross section of the envelope is convex in alignment with the groove sections in the panels. In the illustrated embodiment, the cross section at the rib portions is convex through but a slight flattening of the ribs on the side corresponding to the groove sections, that is on the underside as indicated at 23 in Fig. 2, is permissible and may occur as a result of the molding operation. The provision of ribs in accordance with the invention achieves a substantial increase in implosion resistance of the envelope; the ribs serve as bridges or supports which brace the legs of the U-shaped section and reduce the maximum stress in the envelope, particularly in the inner wall 19, thereby strengthening the envelope.

For maximum strength and resistance to implosion of the vitreous envelope, the length of the grooved panels or, in other words, the longitudinal distance between ribs should be relatively short, using the maximum tube diameter as a unit measure, and not in excess of several tube diameters. For instance, the longitudinal distance between ribs may be approximately 3 tube diameters. With shorter spacing between ribs, the increment in strength tapers off rapidly, that is, little further increase in strength is gained from further reduction in spacing. At the same time the mean perimeter to area ratio of the envelope, taking into account the cross section at the ribs as well as in the grooved panel, rapidly decreases. The advantages of the instant re-entrant groove configuration from the point of view of high efficiency and high loading capacity of the lamp are inherently connected with the re-entrant groove cross section having a high ratio of perimeter to area. Accordingly, for practical purposes a longitudinal distance between ribs of approximately 3 tube diameters is the minimum desirable for a practical lamp. Where less than maximum implosion resistance is required as in tubes of smaller diameter or where it is proposed to use an envelope of greater wall thickness, the longitudinal distance between ribs may be allowed to exceed considerably the figure of approximately 3 diameters which has been proposed. For instance, a panel length or distance between ribs of 12 inches in a T17 envelope having an outer diameter of approximately 2⅛ inches (corresponding to a panel length of approximately 5.6 diameters), provides a substantial increase in implosion resistance by comparison with a lamp of the same size having a continuous groove.

A number of lamps made from T17 tubing of nominal outer diameter 2⅛ inches and length 48 inches having 5 grooved panels with a longitudinal distance between ribs of approximately 8 inches have been shown an increase in implosion resistance of as much as 200 percent over that of similar lamps made with a continuous groove. These lamps made with tubing of .075 inch wall thickness can safely withstand a pressure in excess of 6 atmospheres, that is, 90 pounds per square inch, and some in fact have withstood pressures as high as 150 pounds per square inch.

The dimensions of the envelopes of the foregoing lamps representing a preferred embodiment of the invention, were as follows, reference being made to Fig. 2. The radius of curvature T of outer wall 18 is approximately 1.063 inches measured to the outer surface. The radius of curvature A at 19 in the top of the groove is approximately 0.325 inch measured to the outer surface of the glass. The radius of curvature B of the edge walls 21, 21' is 0.325 inch measured again to the outer surface of the glass. The center of the radii curvature of the edge walls is located a distance C equal to 0.094 inch below the center of the radius of curvature of the concave inner wall of the groove. The slanting side walls of the groove slope outwardly at an angle $\theta$ to the vertical which is in excess of 15° and preferably about 27°. Regarding radii A and B of the groove and of the edge walls, it will be appreciated that when viewed from the inside of the envelope, the radius of the edge wall is actually less than that of the groove by twice the thickness of the glass.

An important factor in the efficiency and loading capacity of re-entrant groove lamps is the degree of equivalent flattening, both the efficiency and the loading capacity at a given efficiency increasing therewith. In a simple flattened tube, for instance an oval tube, the degree of flattening is simply the ratio of maximum to minimum internal dimensions of the cross section. By analogy, in a re-entrant groove cross section such as illustrated in Fig. 2, the degree of equivalent flattening may be taken as the ratio of curved annular breadth of the discharge space given by D to the maximum wall-to-wall spacing opposite the groove and given by E. The illustrated cross section is that of one of the grooved panels where D equals approximately 2.97 inches and E equals approximately 0.600 inch, indicating an equivalent flattening of approximately 5:1. However, in the rib portions dividing the grooved panels, the cross section of the lamp is substantially circular and the grooved panels merge thereinto with a gradual taper. Since the degree of flattening in the rib portions is substantially 1:1 (cross section substantially circular), the effective or mean equivalent flattening for the lamp as a whole will be intermediate that of the grooved panels and that of the rib portions. The equivalent mean flattening of the illustrated lamp is approximately 3:1. In other words, the illustrated lamp will perform in generally the same fashion as regards efficiency and loading capacity and enhanced lumen output in the sector including the groove as a lamp having a continuous groove of lesser depth proportioned to give an equivalent flattening of 3:1. Of course, the lamp illustrated in Figs. 1 and 2 has a much higher strength and implosion resistance than such other lamp of equivalent electrical characteristics.

In accordance with the present invention, the envelope 2 of a grooved lamp of the type described above and shown in Figs. 1 and 2 of the drawing is made by the method and procedure outlined in Figs. 3 to 6. The starting point is an open-ended cylindrical vitreous tube 25, illustrated in Fig. 3. The tube may be of the size commonly designated 48T17, being a few inches under 48 inches in length in order to make a lighting unit 48 inches long when the based lamp is mounted in suitable lampholders. The tube has an outer diameter of approximately 2⅛ inches, a wall thickness of .075 inch, and is already provided with finished annularly reduced or shouldered ends 26, 26 to which the flares of the mounts are sealed during subsequent manufacturing operations.

As illustrated in Fig. 3, tube 25 is seated in a semicylindrical press bed or mold 27 which accommodates the lower half of the cross section of the tube. The tube has previously been heated to a temperature just below the softening point of the glass, for instance approximately 900° F. for a lime glass envelope. Suitable means are also provided to maintain the mold 27 at approximately the same temperature; as illustrated, such means may consist of sheathed electric heating elements 28 running longitudinally through the mold and disposed to surround generally the cavity therein. Vitreous tube 25 is now heated in selected areas to its softening temperature, for instance to approximately 1000° F. The heating may be performed by a gas flame burner 29 to which a combustible gas and air mixture is supplied by conduits 30. Burner 29 extends longitudinally above tube 25 and is provided with downwardly directed gas jets or orifices 31 throughout its length except at 32 over the ends of the tube 25 which are to be maintained cylindrical, and at the locations 33 which correspond to the regions to be maintained substantially circular in cross section in order to form the ribs 17. In the intervening regions which correspond to the grooved panels, the gas jets direct flames 34 downwardly against the vitreous tube in order to heat the glass above its softening point.

The tube 25 in its mold 27 is then located under a vertically reciprocable die or plunger 35 as illustrated in Fig. 4. The plunger 35 is made of stainless steel or other suitable material and is provided with downwardly projecting protuberances 36 separated by cutout portions 37. Means are provided (not shown in the drawing) for heating the plunger 35 and for heating the protuberances 36 and especially the corners 38 thereof approximately to the softening temperature of the glass; this may be done by playing localized gas jets on the corners 38 just prior to the molding operation and depending upon the thermal conductivity of the metal of the plunger to heat sufficiently the remainder of the protuberances. By so doing, the corners of the protuberances are heated slightly more than the body portion thereof in order to facilitate stretching the glass of the envelope next to the ribs which are at a lower temperature.

Just prior to the molding operation, the relative positions of cylindrical tube 25 in mold 27 and of plunger 35 are as illustrated in Fig. 5. The plunger is then forced down as illustrated in Fig. 6 and the protuberances 36 contact the upper surface of envelope 25 in the zones where the glass is heated above its softening temperature. This causes the upper surface of the tube to fold inward in the highly heated zones thereby forming re-entrant cavities of the general cross section of a sector of an annulus, the tube 25 being reformed to the configuration 25′ illustrated in Figs. 4 and 6 corresponding to envelope 2 of lamp 1 previously discussed. In the central part of the grooved panels, the glass merely folds inward without any substantial stretching; however, in the corners next to the rib portions, there is some stretching of the glass as a result of the relatively steep angle in the bottom wall of the cavities at those points.

Preferably the envelope is made without causing the die or plunger to contact the glass over the entire portion of the cross section required to be reformed from the previously circular section. As illustrated in Fig. 6, protuberance 36 is shaped so as to achieve contact with the vitreous envelope in the bottom of the groove at 19 but not along the curved edge walls at 21, 21′, the glass being allowed to form freely at the convex edge walls. If desired, in order to more accurately control the slope of the divergent side walls 22, 22′, protuberance 36 of the plunger may be appropriately shaped to effect contact with the vitreous envelope in those regions. The glass of the tube is not contacted by the cutout portion 37 of the plunger in the regions of the ribs 17 and the final configuration thereof is dependent on maintaining the glass slightly cooler in those regions. The instant free forming process has the advantage of simplicity and economy over other processes such as blowing the glass into a mold. Moreover it tolerates substantial dimensional variations in the size of the original circular sectioned tube, the variations being absorbed in the areas which are free forming.

It is important to maintain the side wall portions at 39, 39′ at a temperature slightly below the softening point of the glass in order to prevent squashing or bowing out of those portions beyond the circular outline of the ends of the envelope. This is particularly desirable because, whereas no particular problem is introduced in subsequent manufacture of the lamp by having portions of the envelope wall deformed inwardly from the original cylindrical outline of the tube, subsequent manufacture would be severely complicated if the reformed glass envelope was allowed to project anywhere beyond the original cylindrical outline. This objective is aided by proportioning the skirts 40, 40′ of the plunger to correspond to the desired outline of side wall portions 39, 39′.

Such proportioning of the skirts 40, 40′ is not essential, however, and such skirts may be eliminated entirely when the dimensional variations of the circular sectioned tubes to be reshaped are within the usual manufacturing tolerances of such tubes intended for use as fluorescent lamp envelopes. For example, the reciprocable die or plunger 41 shown in Figs. 7 and 8 which has no such skirts, has been found satisfactory for use in reshaping such tubes by the method of the invention.

The plunger 41 shown in Figs. 7 and 8 is similar to the plunger 35 shown in Figs. 4, 5 and 6 in that it is provided with downwardly projecting separated protuberances which correspond to the protuberances 36 separated by the cutout portions 37 of plunger 35 and which, on downward movement of the plunger, reshape the envelope or tube 25 in the manner described above in connection with Figs. 4, 5 and 6.

The plunger 41 of Figs. 7 and 8 is different in structure from the plunger 35 not only in the elimination of the skirts but also in that it is made up of a plurality of metal members instead of consisting of a single metal piece. As shown in these figures the plunger comprises a plurality of cylindrical rods 42 and a T-shaped support member 43, 44. The support includes two metal plates 43 and 44 fastened together, as by being welded, at right angles to each other. The rods 42 may correspond in number to the protuberances 36 on plunger 35 and are mounted along the lower edge of the plate 44. The rods are spaced apart along the lower edge of the plate 44, are larger in diameter than the thickness of plate 44, and are bent to form spaced protuberances on the plunger similar in shape to the protuberances 36 on the plunger 35. The lower edge of the plate 44 is shaped in conformity with the rods 42 and the upwardly directed ends of the rods are welded to the lower end of the plate 44 as shown in Fig. 8. Preferably the plates 43 and 44 are of cold-rolled steel and the rods 42 of stainless steel. A rod diameter of five-eights of an inch is satisfactory for reshaping the 48T17 tubes mentioned above which are two and one-eighth inches in outer diameter and have a wall thickness 0.075 inch.

In carrying out the method of the invention to reshape glass tubes to the form described above, the die plunger is moved downwardly toward the mold and the glass tube contained therein in such manner that the centers of the lowermost rounded surfaces of the protuberances are in a vertical plane including the longitudinal axis of the tube to be reshaped. As the plunger is moved downward, in this manner, the aforementioned surfaces first make a line contact with the plastic parts of tube 25 which contact increases in area as the plunger continues to move toward the longitudinal axis of the tube 25 and extends a substantial angular distance approaching but less than 180° around the rounded surfaces of the protuberances at the end of the downstroke of the plunger. The downward movement of the plunger is stopped when the wall spacing E (Fig. 2) equals approximately 0.600 inch in 48T17 tubes. Obviously, the form of the reshaped tube may be changed by locating the centers of such surfaces to one side or the other of the tube axis while reshaping the tube 25.

After the plunger has been raised from the tube and is in the position shown in Fig. 4 of the drawing, the tube is allowed to remain in the mold until the reshaped parts thereof have cooled sufficiently to lose their plasticity and to become hard or rigid. The tube is then removed from the mold for annealing in the usual manner.

While preferred embodiments of the invention have been disclosed, it will be understood that variations and changes may be made therein within the scope of the invention as defined by the appended claims. It will be understood particularly that the heating of the cylindrical glass tube prior to the reshaping thereof by the plunger may be accomplished in various ways provided that the separated elongated longitudinally extending zones of the tube to be reshaped by the plunger are plastic and the parts of the tube outside said zones, including the parts thereof between said zones, are at a temperature below that at which the tube becomes plastic before the protuberances on the plunger are brought into engagement with the longitudinally extending circumferentially restricted cylindrical tube wall portions to be reshaped by direct contact with the rounded surfaces of the protuberances and form the bottoms of the re-entrant grooves.

What we claim as new and desire to secure by Letters Patent of the United States is:

1. The method of reshaping elongated open-ended cylindrical glass tubes which comprises the steps of heating the tube to a temperature slightly below the temperature at which the glass wall of the tube softens and becomes plastic while horizontally supporting the tube stationary on its axis along its entire length and around the lower part of its outer circumference, heating to plasticity the wall of the tube in elongated longitudinally extending spaced apart zones only of the tube and then folding the plastic wall of the tube in said spaced zones inwardly of the tube by forcing a longitudinally extending circumferentially restricted upper portion of the tube wall in each of said zones vertically downward a distance sufficient to change the cross sectional shape of the tube in each of said zones from circular to concavo-convex while retaining the cylindrical shape of the tube outside said zones including the parts thereof between said zones.

2. The method of reshaping elongated open-ended cylindrical glass tubes which comprises the steps of heating the tube to a temperature slightly below the temperature at which the glass wall of the tube softens and becomes plastic while horizontally supporting the tube stationary on its axis along its entire length and around the lower part of its outer circumference, heating to plasticity the wall of said tube in elongated longitudinally extending spaced apart zones only of the tube and on one side of said tube and then folding the plastic wall of the tube in said spaced zones inwardly of the tube by forcing a longitudinally extending circumferentially restricted upper portion of the tube wall in each of said zones vertically downward a distance sufficient to change the cross sectional shape of the tube in each of said zones from circular to concavo-convex while retaining the cylindrical shape of the tube wall outside said zones including the parts thereof between said zones.

3. The method of reshaping elongated open-ended cylindrical glass tubes which comprises the steps of heating the tube to a temperature slightly below the temperature at which the glass wall of the tube softens and becomes plastic while horizontally supporting the tube stationary on its axis along its entire length and around the lower part of its outer circumference, heating to plasticity the wall of the tube in elongated longitudinally extending spaced apart zones only of the tube and then folding the plastic wall of the tube in said spaced zones inwardly of the tube by forcing a longitudinally extending circumferentially restricted upper portion of the tube wall in each of said zones vertically downward toward the longitudinal axis of the tube a distance sufficient to change the cross sectional shape of the tube in each of said zones from circular to concavo-convex while retaining the cylinder shape of the tube outside said zones including the parts thereof between said zones.

4. The method of reshaping a cylindrical glass tube to form a vitreous envelope for an evacuated electrical device of generally tubular form having re-entrant spaced apart aligned grooves extending longitudinally along one side thereof with the wall of said grooves defining with the opposed cylindrical portions of the wall of said envelope a sector of an annulus and the longitudinal sections of said envelope between the grooved sections thereof being approximately cylindrical so as to provide along said envelope between said grooves ribs strengthening said envelope against implosions, which comprises the steps of heating an open ended cylindrical glass tube to a temperature slightly below the temperature at which the glass wall of said tube softens and becomes plastic while horizontally supporting the tube stationary on its axis and around the lower part of its outer circumference, heating to plasticity the wall of said tube in elongated longitudinally extending spaced apart zones only of said tube wall, and then folding the plastic wall of the tube in said spaced zones inwardly of the tube by forcing a longitudinally extending circumferentially restricted upper portion of the tube wall in each of said zones vertically downward a distance sufficient to form transversely re-entrant grooves in the wall of the tube in said zones but insufficient to stretch appreciably the folded circumferential portion of the wall defining the re-entrant groove while retaining the cylindrical shape of the tube outside said zones including the parts thereof between said zones.

References Cited in the file of this patent

UNITED STATES PATENTS

| | | |
|---|---|---|
| 283,625 | Locke | Aug. 21, 1883 |
| 1,948,560 | Borneman | Feb. 27, 1934 |
| 2,410,616 | Webb | Nov. 5, 1946 |
| 2,610,444 | Kurz | Sept. 16, 1952 |
| 2,728,135 | Rockwell | Dec. 27, 1955 |

FOREIGN PATENTS

| | | |
|---|---|---|
| 619,965 | Great Britain | Mar. 17, 1949 |